J. H. HECKER.
CHAIN FASTENER.
APPLICATION FILED NOV. 1, 1919.
1,340,484.
Patented May 18, 1920.
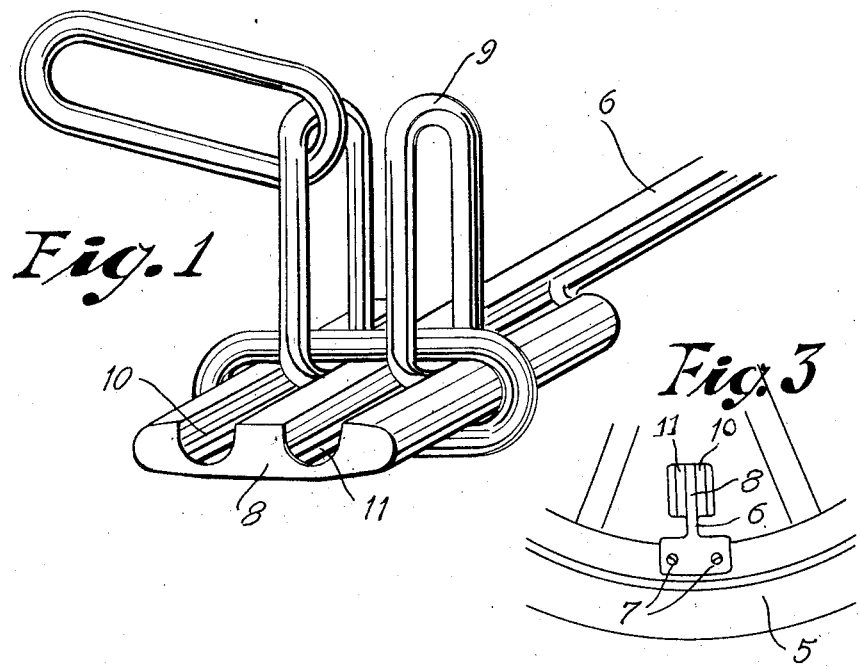
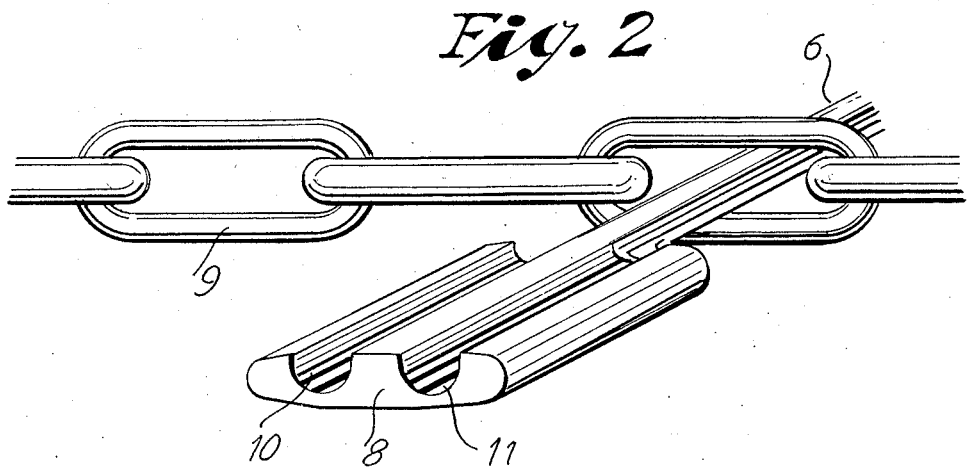

UNITED STATES PATENT OFFICE.

JOHN H. HECKER, OF NEW ORLEANS, LOUISIANA.

CHAIN-FASTENER.

1,340,484.  Specification of Letters Patent.  Patented May 18, 1920.

Application filed November 1, 1919. Serial No. 335,097.

*To all whom it may concern:*

Be it known that I, JOHN H. HECKER, a citizen of the United States of America, and resident of New Orleans, in the county of Orleans and State of Louisiana, have invented certain new and useful Improvements in Chain-Fasteners, of which the following is a specification.

This invention relates to chain attaching and holding means and particularly to a device operative as a substitute for a hook whereby chains may be attached to objects in a manner to prevent accidental disengagement or dislodgment.

The device is of special importance in connection with the attaching of antiskid chains to wheels of vehicles and particularly for holding such chains on truck wheels where the chains employed are relatively heavy.

An object of this invention is to provide novel means attachable to rims of wheels of vehicles whereby chains with elongated links can be applied to the holders (to be hereinafter termed "hooks") and held against accidental displacement notwithstanding the wheels of the vehicle may travel in mud which would have a tendency to dislodge such chains.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a perspective view of the hook with the links of the chain in positions to be applied to the hook;

Fig. 2 illustrates a perspective view showing the relation of parts with the chain applied to the hook; and Fig. 3 illustrates a view on a reduced scale showing the hook applied to a wheel.

In these drawings 5 denotes a vehicle wheel, 6 the shank of the hook applied thereto and secured by fastenings 7, such as screws, and 8 the head of the hook.

In practice it is imperative that the head of the hook must be of the same shape, have approximately the same width and thickness as the shape, length and width respectively of the interior of the links 9, in order that the links may be applied to the said head, as shown in Fig. 1, it being seen that the head has longitudinally extending grooves 10 and 11 which afford clearances for the links contiguous to the link which is on the head, making it possible to arrange the links to permit their being forced over the head of the hook to the shank, after which the links may be released to assume the positions shown in Fig. 2. The length of the head of the hook must be greater than the length of the interior of the links 9 in order to prevent the links, when in position shown in Fig. 2, from passing diagonally over the said head then the chain cannot be disengaged from the hooks without causing the links to be reassembled as shown in Fig. 1 and that can be attained only by manipulation.

The device of the invention can be made strong and durable and will prove comparatively inexpensive and it will have advantages in that manipulation to remove the chain can be carried on without hindrance from deposits of soft mud as the movement of the links with relation to the head will dislodge said deposits.

I claim:

1. In a fastening for tire chains, a body having longitudinally disposed grooves in its face, and a shank on the body adapted to be secured to a rim of a wheel.

2. In a fastener for chains, a body having shape, width and thickness approximately the shape, length and width respectively of a chain link internally, said body having grooves in its face extending at an angle to its width, and means for anchoring the said body.

3. In a fastener for tire chains, a body having longitudinally disposed grooves in its face, a shank on the body adapted to be secured to a rim of a wheel, and a chain having links, one of which is adapted to pass over the body and having other links adapted to stand at an angle to the last mentioned link to enter the grooves.

JOHN H. HECKER.